United States Patent [19]
Goshima et al.

[11] 3,947,093
[45] Mar. 30, 1976

[54] OPTICAL DEVICE FOR PRODUCING A MINUTE LIGHT BEAM

[75] Inventors: Takeshi Goshima, Tokyo; Kiyonobu Endo, Yokohama, both of Japan

[73] Assignee: Canon Kabushiki Kaisha, Tokyo, Japan

[22] Filed: June 26, 1974

[21] Appl. No.: 483,406

[30] Foreign Application Priority Data
June 28, 1973  Japan.............................. 48-72287
July 13, 1973  Japan.............................. 48-78409

[52] U.S. Cl.............. 350/189; 219/121 L; 350/190; 350/191; 350/200; 350/206
[51] Int. Cl.².................... G02B 13/18; G02B 17/08
[58] Field of Search .......... 350/190, 191, 189, 200, 350/204, 206, 199; 219/121 L

[56] References Cited
UNITED STATES PATENTS

| | | |
|---|---|---|
| 1,988,946 | 1/1935 | Hauser et al..................... 350/199 X |
| 3,419,321 | 12/1968 | Barber et al..................... 360/189 X |
| 3,547,526 | 12/1970 | Devereux......................... 350/189 X |
| 3,632,955 | 1/1972 | Cruickshank et al........... 350/190 X |
| 3,826,561 | 7/1974 | Gregg................................ 350/204 |

*Primary Examiner*—John K. Corbin
*Attorney, Agent, or Firm*—Fitzpatrick, Cella, Harper & Scinto

[57] ABSTRACT

An optical device for producing a minute beam comprises beam forming means such as laser generator or the like, annular beam forming means such as lens or annular aperture mask for forming the beam from the beam forming means into a beam of annular cross section, and a condenser lens for condensing the annular beam from the annular beam forming means.

9 Claims, 23 Drawing Figures

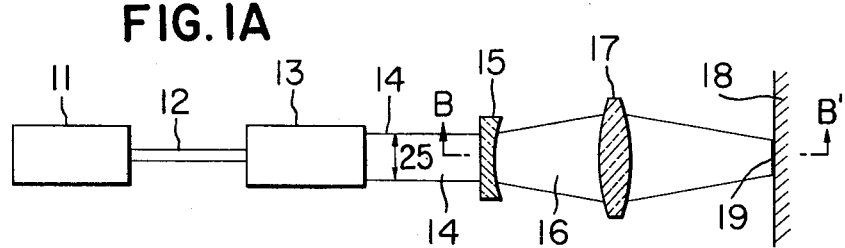
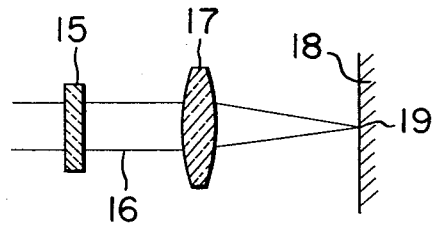
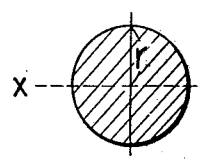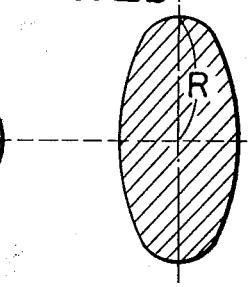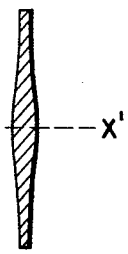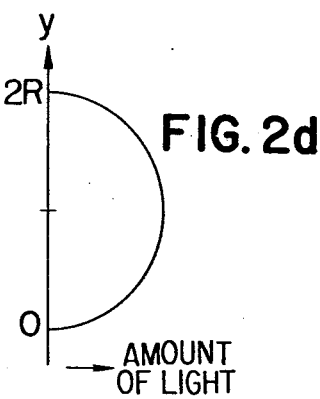
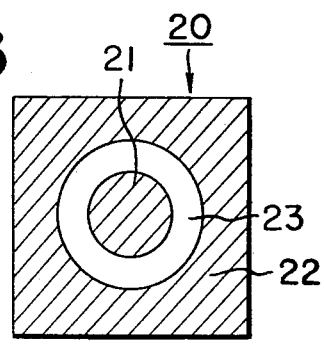

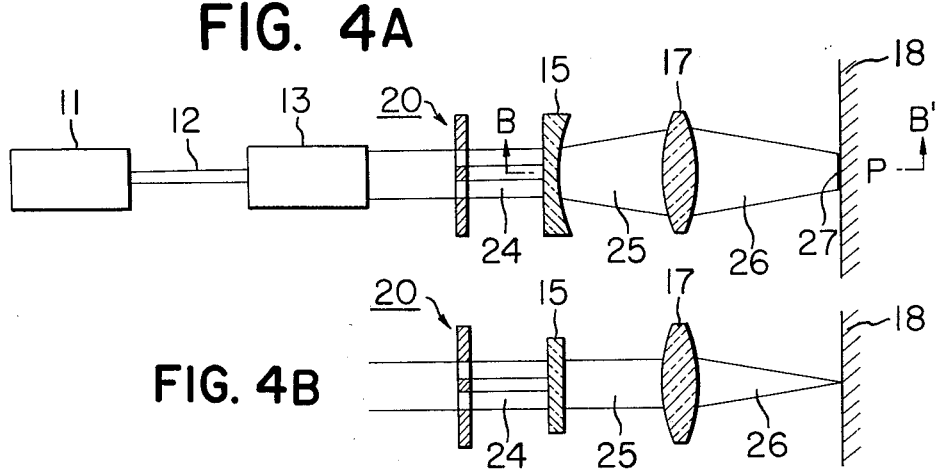
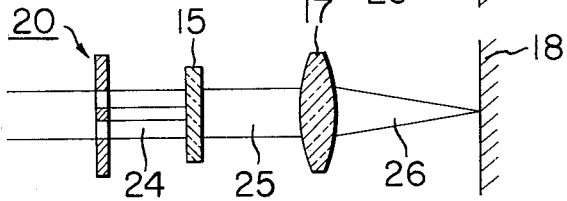
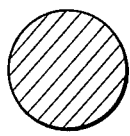
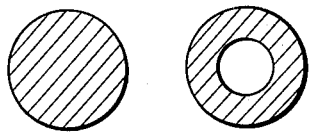
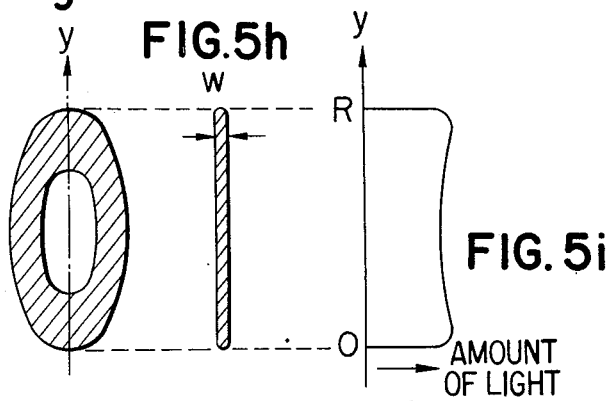
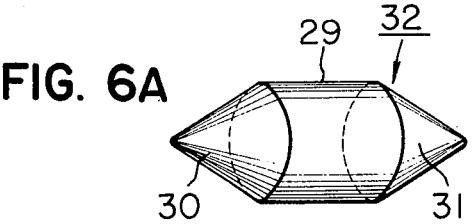
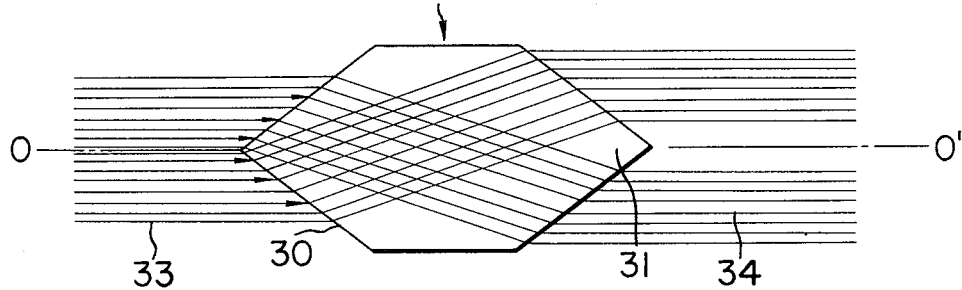

OPTICAL DEVICE FOR PRODUCING A MINUTE LIGHT BEAM

BACKGROUND OF THE INVENTION

1. Field of the Invention

This invention relates to an optical system for producing a minute light beam in such a manner that the beam intensity is uniformly distributed throughout a minute image which is formed by condensing the light beam from a light source with the aid of a lens or the like.

2. Description of the Prior Art

As a method of recording wide-band signals such as TV signals on a recording medium, it is widely known to use a magnetic head movable relative to a magnetic recording medium such as magnetic tape or disc to effect recording on such magnetic recording medium. There is another method whereby a light beam such as a laser modulated by recording signal is thrown upon a sensitive plate or a thermally deformable substrate while the former is moved relative to the latter, thereby recording the recording signal on the substrate in the form of the projection locus of the light beam.

When using a light beam to effect recording on the substrate as described above, it is preferable that the light beam thrown upon the substrate be condensed to increase the density of the signals recorded on the substrate. The cross-sectional configuration of the thus condensed light beam may be linear or a minute circle in accordance with suitable selection of the method of modulating the light beam with the aid of recording signal. For example, where a linear beam is used, the light beam and the substrate may be moved relative to each other at a predetermined speed and in a predetermined direction while the light beam is being modulated for interception or passage in accordance with the recording signal. Thereby, a projection locus of the light beam parallel to the linear image and corresponding to the recording signal may be provided on the substrate in a belt-like track thereof having a width equal to the length of the linear image.

Also, where a beam of minute circular cross-section is used, the light beam and the substrate may be moved relative to each other at a predetermined speed while the light beam may be deflected to right and left over a predetermined width and at a speed corresponding to the frequency of the recording signal. Thereby, the continuation of sinewaves with the frequency thereof controlled by the frequency of the recording signal is formed on the substrate.

An arrangement for producing a light beam of linear cross-section will now be considered with reference to FIG. 1A of the accompanying drawings. A light source 11 such as conventional laser generator or the like generates a parallel beam 12 of circular cross-section, which is directed to the beam expander 13 for expanding the width of the parallel beam 12. The beam expander 13 produces a parallel beam 14 having a width ($2r$) greater than that of the previous parallel beam 12. The parallel beam 14 in turn is directed to a cylindrical lens 15, whereby the parallel beam 14 is diffused only in one direction parallel to the plane of the drawing sheet. The cylindrical lens need not always be of a negative refractive power as shown in FIG. 1A, but it may also be of a positive refractive power.

The light beam 16 so diffused only in one direction is directed to a condenser lens 17 which is a convex lens, whereby a linear image 19 may be formed on a focusing plate 18 positioned in the focal plane of the condenser lens 17.

Thus, a belt-like track corresponding to the formed linear image may be provided on the substrate by inserting in the path of the parallel beam 12 a light modulator which will prevent passage of the light through such path upon application of a voltage above a predetermined level but permit passage of the light through such path upon application of a voltage below the predetermined level, designing the light modulator so as to be driven by recording signal, forming the focusing plate 19 of a substrate comprising a sensitive plate, and moving the substrate in a direction perpendicular to the plane of the drawing sheet.

The above-described arrangement for producing a linear light beam suffers from disadvantages as well hereinafter be described.

Considering now the cross-section of the light beam, the cross-section of the light beam passed through the expander 13 (i.e. the cross-section of the parallel beam 14 in FIG. 1A taken along a plane perpendicular to the drawing sheet) is circular as shown in FIG. 2a (because the light source 11 emits a beam of circular cross-section), whereas the cross-section of the diffused light beam 16 adjacent the condenser lens 17 is elliptical as shown in FIG. 2b, and the image formed on the substrate by the light beam 16 passed through the condenser lens 17 to sensitize the substrate is not a perfect line but becomes bulged in the center portion (near the X–X' axis) as shown in FIG. 2c, although this figure is an exaggeration for providing a better understanding. This occurs because, as shown in FIG. 2b, the intensity of the light energy on Y-axis of the beam of elliptical cross-section before reaching the cylindrical lens 15 is greater toward the center axis and sharply decreased toward the periphery, as illustrated in FIG. 2d.

As a result, the linear image formed on the substrate of sensitive material undergoes an overexposure in the center portion thereof, so that such center portion becomes thicker as shown in FIG. 2c, and this is inconvenient to the provision of a very minute linear image.

SUMMARY OF THE INVENTION

It is therefore an object of the present invention to provide an optical device for producing a minute light beam which can form a minute beam projection locus on a substrate.

It is another object of the present invention to provide an optical device for producing a minute light beam with uniform energy distribution throughout the beam.

It is still another object of the present invention to provide an optical device for producing a minute light beam of high energy intensity.

Other objects and features of the present invention will become apparent from the following detailed description taken in conjunction with the accompanying drawings.

BRIEF DESCRIPTION OF THE DRAWINGS

FIG. 1A schematically shows a prior art optical device for producing a minute linear image.

FIG. 1B is a cross-sectional view of the same optical device taken along a plane perpendicular to the plane of the drawing sheet and lying on the line B–B' of FIG. 1A, and showing the essential portions of the device.

FIGS. 2a, 2b and 2c are cross-sections of the light beams in various portions of the optical device shown in FIG. 1A, and FIG. 2d illustrates the energy distribution in the light beam shown in FIG. 2c.

FIG. 3 is a front view of an annular aperture mask.

FIG. 4A schematically shows an optical device for producing a minute linear image according to the present invention.

FIG. 4B is a cross-sectional view of such optical device taken along a plane perpendicular to the plane of the drawing sheet and lying on the line B–B' of FIG. 4A, and showing the essential portions of the device.

FIGS. 5e, 5f, 5g and 5h are cross-sections of the light beams in various portions of the optical device shown in FIG. 4A, and FIG. 5i illustrates the energy distribution in the light beam shown in FIG. 5h.

FIGS. 6A and 6B are a perspective view and a cross-sectional view, respectively, of a lens for providing an annular light beam distribution.

DESCRIPTION OF THE PREFERRED EMBODIMENTS

Figure 7A:
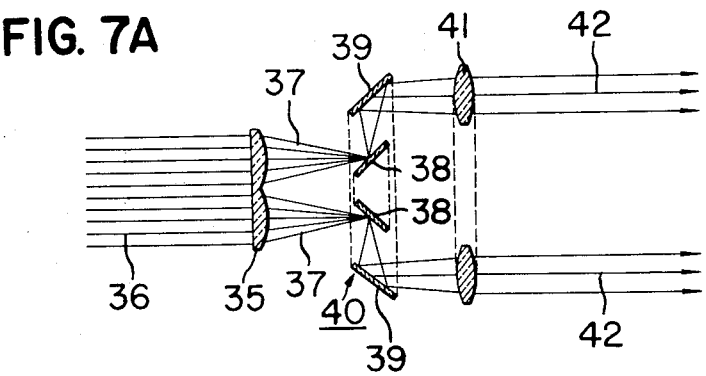
FIG. 7A is a cross-sectional view of an optical device for providing an annular light beam distribution.
Figure 7B:
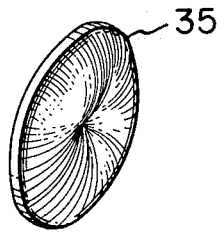
FIGS. 7B and 7C are perspective views showing the essential portions of FIG. 7A.
Figure 7C:
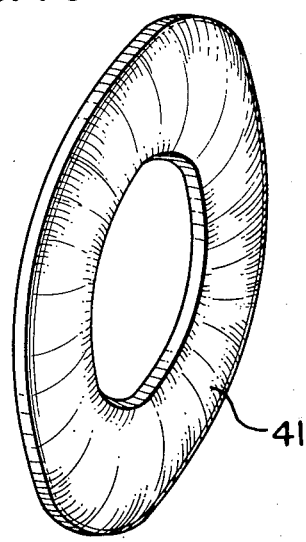
Figure 7D:
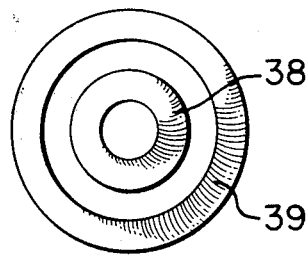
FIG. 7D is a front view of an annular mirror structure.

The present invention comprises a combination of an optical device for forming a linear image as shown in FIG. 1A, and an optical device for providing a ring-shaped distribution of light beam.

The simplest form of the optical device for providing a ring-shaped distribution of light beam is a mask called "annular aperture".

This mask, as shown in FIG. 3, comprises a light-transmitting member 20 such as glass or the like having a uniform thickness and two parallel surfaces, and provided with a first light-intercepting portion 21 formed by a light-intercepting material applied in an annular form, a second light-intercepting portion 22 formed by a light-intercepting material applied in an annular form larger than the first annulus, and a ring-shaped light-transmitting portion 23 formed between the first and second light-intercepting portions 21 and 22.

According to the present invention, the means for providing a ring-shaped distribution of light beam, such as the above-described annular aperture mask, is disposed in the optical path of the optical device shown in FIG. 1A.

FIG. 4A shows an embodiment of the present invention wherein an annular aperture mask is inserted in a parallel light beam 14. The arrangement of FIG. 4A differs from that of FIG. 1A in that the above-described annular aperture mask 20 is inserted in the parallel light beam 14 between a beam expander 13 and a cylindrical lens 15. In FIG. 4A, similar reference characters are similar in significance to those used in FIG. 1.

The embodiment of FIG. 4A will be described in conjunction with FIGS. 5e, 5f, 5g and 5h which show cross-sections of the light beams. The light beam directed through the beam expander 13 presents a circular cross-section as shown in FIG. 5e, because the parallel light beam 12 from the light source has a circular cross-section, but by being passed through the annular aperture mask 20, the light beam now designated by 24 presents a ring-shaped cross-section as shown in FIG. 5f.

Accordingly, the light beam 25 passed through the cylindrical lens 15 to the condenser lens 17 presents a elliptical ring-shaped cross-section as shown in FIG. 5g. Such elliptical ring-shaped light beam 26 is focused by the condenser lens 17, whereby there is formed a linear image such as 27 on a substrate formed on a sensitive material alone. Such a linear image formed by sensitization, as shown in FIG. 5h, has a generally uniform width W which is a minute width.

The reason is that, due to the annular aperture mask 20 inserted, an elliptical ring-shaped light beam is thrown upon the condenser lens 17 and the center light beam portion is eliminated by the first light-intercepting portion 21 of the annular aperture mask so that the distribution of the light energy is generally uniform as shown in FIG. 5i. Therefore, the distribution of the light energy is substantially uniform throughout the linear image formed by the condenser lens 17 and, even if a substrate is disposed at the portion of the focusing plate 18, no partial over-exposure will occur and there may be provided the linear image as shown in FIG. 5h.

In FIG. 4A, the annular aperture mask 20 is inserted between the expander 13 and the cylindrical lens 15, but this is not the only possible position for the annular aperture mask 20. For example, the mask 20 may be disposed between the cylindrical lens 15 and the condenser lens 17 or between the condenser lens 17 and the focusing plate 18. In these latter cases, however, the light-transmitting portion 23 of the annular aperture mask must assume an elliptical ring-shape.

The optical element for converting the light beam of circular cross-section to the ring-shaped light beam is not restricted to the above-described annular aperture mask but may be a transparent member comprising a cylindrical intermediate portion 29 having opposite end portions 30 and 31 coaxially formed therewith, as shown in FIG. 6A.

As shown in FIG. 6B, when a light beam 33 is thrown upon such optical element 32 in parallelism to the center axis 0–0' thereof, the light enters the end portion 30 and is refracted thereat in accordance with the refractive index peculiar to the material of the transparent member in the manner as shown, and then passed through the end portion 30, the intermediate cylindrical portion 29 and the other end portion 31, which the light leaves as it is again refracted in accordance with the aforesaid refractive index, thereby forming a parallel light beam 34. As can be seen from FIG. 6B, the emergent light beam is inverted and wider in such a manner that the inner light rays at the incidence side provides the outer light rays at the emergence side. Under such conditions, the region of the parallel light beam 34 near the center axis 0–0' has no light ray so that the light beam 34 is of ring-shaped cross-section.

The distribution of the light beam at the emergence side is variable with the vertical angle of the conical portion, the length of the cylindrical portion (of course, including zero length of the cylindrical portion as known from U.S. Pat. No. 3,547,526), the refractive index of the material, etc., and any desired size of ring-shaped cross-section may be attained. However, where the cylindrical portion is present, the size of the resultant ring-shaped beam may be varied only by varying the length of the cylindrical portion without the configuration of the end portions being changed.

Thus, the use of such optical element 32 in lieu of the annular aperture mask 20 shown in FIG. 4A may produce a minute linear image similar to that described in connection with FIG. 4A. In this case, however, the cross-section of the resultant beam lacks a definite ring-shaped outline and has dim or vague outer and inner peripheries.

FIG. 7A shows another form of the optical system for providing a light beam of ring-shaped cross-section. This optical system includes a doughnut-shaped lens 35 having substantially no inner opening. This lens 35 condenses a parallel light beam 36 into an annular beam 37. The annular beam 37 may be directed to an annular mirror structure 40 which comprises a first annular mirror 38 having annular reflecting surfaces for deflecting the light beam by 90° and a second annular mirror 39 for causing the reflected light from the first annular mirror 38 to travel again in the same direction as the parallel light beam 36. The light leaving the annular mirror structure 40 may again be passed through a right-shaped condenser lens 41 to form a parallel light beam 42.

As will be seen from the figure, the parallel light beam 42 is in an annular form and the optical system of FIG. 7A may be employed in lieu of the annular aperture mask 20 of FIG. 4A to attain the same result as that described with respect to FIG. 4A.

A ring-shaped distribution of light beam may not only be provided by the use of the above-described means but also may be provided directly from a laser as light source by adjusting a mirror in the laser. This is known from, for example, APPLIED OPTICS, October 1966, Vol. 5, No. 10, p. 1563, and is called the doughnut mode by those skilled in the art. A laser beam presenting such doughnut mode may be generated by the laser generator 11 in FIG. 4A, whereby the annular aperture mask 20 may be eliminated while the same result as that described in connection with FIG. 4A may be provided.

Figure 8:
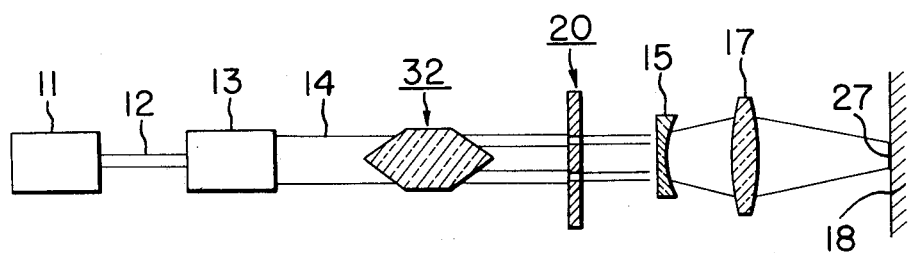
FIG. 8 schematically illustrates another embodiment of the optical device for producing a minute linear image according to the present invention.
Figure 9:
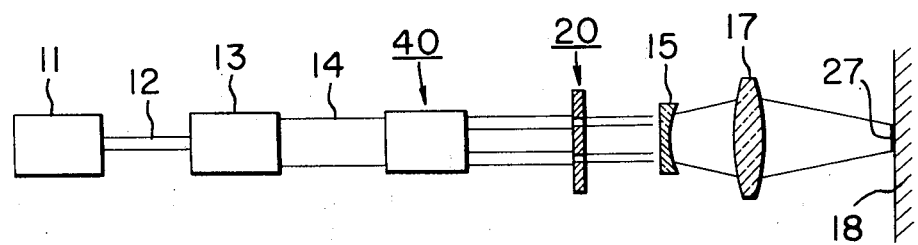
FIG. 9 schematically illustrates still another embodiment of the optical device for producing a minute linear image according to the present invention.

The annular aperture mask is meritorious in that it is easy to make, whereas such mask in demeritorious in that since the light-intercepting center portion thereof intercepts the center portion of the light beam which is of the maximum intensity, the use of such mask accompanies a great loss of light. In this case, as shown in FIG. 8 or 9, either a lens 32 or an optical device 40 may be disposed in the parallel light beam 14 so that almost all of the ring-shaped light beam provided through such lens 32 or optical device 40 may be passed through the light-transmitting portion 23 of the annular aperture mask 20.

The ring-shaped beam thus provided through the lens 32 or the optical device 40 lacks a definite outline and does not always present a desired ring-shape. It is therefore preferable to provide a desired ring-shape of the light beam by selecting a suitable configuration for the light-transmitting portion 23 of the annular aperture mask 20.

After so converted to the ring-shaped light beam, the light beam may be passed to the annular aperture mask, whereby the loss of light may be avoided. In FIGS. 8 and 9, similar reference characters are similar in significance to those in FIG. 1A.

The loss of light may also be avoided by using the described means for providing a ring-shaped light beam with an optical device for providing a minute spot beam of circular cross-section, instead of the optical device for providing a linear image.

A spot image may be produced on the focal plane of a condenser lens by directing a parallel beam of circular cross-section through the condenser lens. For example, in *Principles of Optics*, by Max Born and Emil Wolf, Section 8.6.2, p. 414–418, it is taught that a smaller spot image may be produced by using an annular aperture mask to make the parallel beam directed to the condenser lens into a ring-like shape, but the spot image thus produced is of reduced intensity because the center portion of the light beam is intercepted by the annular aperture mask.

Figure 10:
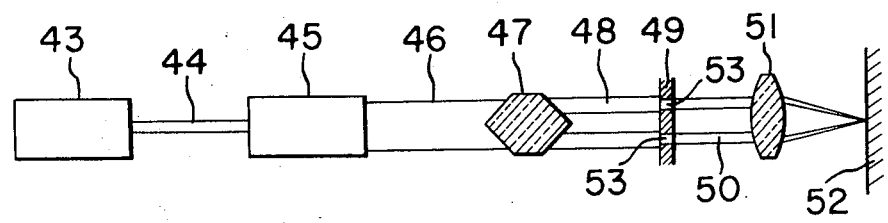
FIG. 10 schematically illustrates a further embodiment of the optical device for producing a minute spot according to the present invention.

To avoid this, as is shown in FIG. 10, a parallel beam 44 generated by a laser generator 43 may be directed through a beam expander 45 to provide a wider parallel beam 46, which may then be passed through a lens 47 similar to the aforesaid lens 32 to provide a beam 48 of annular cross-section. Such beam 48 in turn may be directed through an annular aperture mask 49 to provide a definitely outlined beam 50 of annular cross-section, which may then be directed through a condenser lens 51 to thereby produce a minute spot on the focal plane 52 of the lens 51.

In this manner, reduction in the beam energy of the resultant beam spot may be avoided by pre-forming an annular beam 48 through the lens 47 and directing such beam through an annular aperture mask having a light-transmitting portion 53 through which almost all of the annular beam 48 may pass.

In FIG. 10, the reason why the beam 48 of annular cross-section formed through the lens 47 is further directed through the annular aperture mask for forming an annular beam is that, since the beam 48 provided through the lens 47 is dimly outlined without presenting a definite annular shape, such dim portion of the beam must be removed by the annular aperture mask in order to provide a definitely outlined beam of definite annular cross-section.

It will be apparent that, instead of the lens 47, the optical system for providing a beam of annular cross-section as shown in FIG. 7A may be used with the same result as that described in connection with FIG. 8.

We claim:
1. An optical device for producing a minute beam, comprising:
   means for producing a beam;
   means for forming the beam produced by said beam producing means into a beam of an oval annular cross-section;
   means for condensing the oval annular beam formed by said beam forming means, onto a focal plane thereof to form a linear image thereon having a substantially uniform distribution of light energy along its length.
2. A device according to claim 1, wherein said beam forming means comprises:
   means for forming the beam produced by said beam producing means into a beam of annular cross-section;
   means for diffusing the annular beam in only one direction to reform the annular beam into a beam of oval annular cross-section.

3. A device according to claim 2, wherein said annular beam forming means comprises an annular aperture mask having an annular transparent portion.

4. A device according to claim 2, wherein said annular beam forming means comprises a lens having a conical light inlet portion and a conical light outlet portion.

5. A device according to claim 2, wherein said annular beam forming means comprises a first annular condenser lens, a first annular mirror for causing the annular beam to be condensed by said annular condenser lens to be reflected in a direction substantially at a right angle with respect to the incident light, a second annular mirror for causing the light from said first annular mirror to be reflected in a direction parallel to the light incident on said first annular condenser lens, and a second annular lens for passing therethrough the beam from second annular mirror to form a parallel beam.

6. An optical device for producing a minute beam, comprising:
- means for producing a beam;
- means for forming the beam produced by said beam producing means into a beam of an annular cross-section;
- means for diffusing the annular beam formed by said annular beam forming means, in only one direction to deform the annular beam into a beam of an oval annular cross-section; and
- means for condensing the oval annular beam formed by said beam forming means, onto a focal plane thereof to form a linear image thereon having a substantially uniform distribution of light energy along its length.

7. A device according to claim 6, wherein said annular beam forming means comprises an annular aperture mask having an annular transparent portion.

8. A device according to claim 7, wherein said annular beam forming means comprises a lens having a conical light inlet portion and a conical light outlet portion.

9. A device according to claim 7, wherein said annular beam forming means comprises a first annular condenser lens, a first annular mirror for causing the annular beam to be condensed by said annular condenser lens to be reflected in a direction substantially at a right angle with respect to the incident light, a second annular mirror for causing the light from said first annular mirror to be reflected in a direction parallel to the light incident on said first annular condenser lens, and a second annular lens for passing therethrough the beam from said second annular mirror to form a parallel beam.

* * * * *